United States Patent
Cafasso et al.

(10) Patent No.: US 9,591,019 B2
(45) Date of Patent: Mar. 7, 2017

(54) MALICIOUS OBJECT DETECTION

(71) Applicant: F-Secure Corporation, Helsinki (FI)

(72) Inventors: Matteo Cafasso, Turin (IT); Matias Suarez, Helsinki (FI); Ville Lindfors, Helsinki (FI); Jarno Niemela, Kirkkonummi (FI)

(73) Assignee: F-Secure Corporation, Helsinki (FI)

( * ) Notice: Subject to any disclaimer, the term of this patent is extended or adjusted under 35 U.S.C. 154(b) by 168 days.

(21) Appl. No.: 14/068,133

(22) Filed: Oct. 31, 2013

(65) Prior Publication Data

US 2014/0130164 A1    May 8, 2014

(30) Foreign Application Priority Data

Nov. 6, 2012  (GB) .................................. 1219905.5

(51) Int. Cl.
| | |
|---|---|
| *G06F 11/00* | (2006.01) |
| *H04L 29/06* | (2006.01) |
| *G06F 21/36* | (2013.01) |
| *G06F 21/56* | (2013.01) |

(52) U.S. Cl.
CPC ............ *H04L 63/145* (2013.01); *G06F 21/36* (2013.01); *G06F 21/564* (2013.01); *H04L 63/1408* (2013.01)

(58) Field of Classification Search
CPC ... H04L 63/145; H04L 63/1408; G06F 21/36; G06F 21/564
See application file for complete search history.

(56) References Cited

U.S. PATENT DOCUMENTS

| | | | | |
|---|---|---|---|---|
| 8,296,664 | B2 * | 10/2012 | Dixon ................... | G06Q 10/06 715/760 |
| 8,966,582 | B1 * | 2/2015 | Ainslie ................... | G06F 21/51 726/2 |
| 2003/0123703 | A1 * | 7/2003 | Pavlidis ............. | G06K 9/00335 382/103 |
| 2005/0228622 | A1 * | 10/2005 | Jacobi ................... | G06Q 40/08 703/2 |
| 2008/0178288 | A1 * | 7/2008 | Alperovitch ........ | H04L 63/0227 726/22 |
| 2009/0021583 | A1 * | 1/2009 | Salgar .................... | H04N 7/181 348/159 |
| 2009/0254499 | A1 * | 10/2009 | Deyo .............................. | 706/12 |
| 2010/0235915 | A1 * | 9/2010 | Memon et al. .................. | 726/23 |
| 2010/0316300 | A1 * | 12/2010 | Epshtein et al. .............. | 382/229 |
| 2011/0218948 | A1 * | 9/2011 | De Souza et al. .............. | 706/12 |
| 2012/0066346 | A1 * | 3/2012 | Virmani ................ | G06F 21/552 709/219 |
| 2012/0133774 | A1 * | 5/2012 | Sarhan ............. | G08B 13/19645 348/159 |

\* cited by examiner

*Primary Examiner* — Techane Gergiso
(74) *Attorney, Agent, or Firm* — Harrington & Smith (57) ABSTRACT

Malicious object detection is disclosed. An apparatus includes one or more processors, and one or more memories including computer program code. The one or more memories and the computer program code are configured to, with the one or more processors, cause the apparatus at least to perform: obtain image data; obtain association data relating to the image data; identify the image data as corresponding to an identified image among known reference images; and set reputation data of the association data as suspicious, if the association data does not match acceptable associations for the identified image.

20 Claims, 10 Drawing Sheets

```
700 SOURCE CODE OF WEB PAGE
<a href="http://www.example.com">
  <img src="http://www.example.net/the_showed_image.jpg"/>
</a>
```

MALICIOUS OBJECT DETECTION

FIELD

The invention relates to malicious object detection.

BACKGROUND

Computer use such as surfing the World Wide Web or Internet may be hazardous as criminals have infested it by malicious software (malware) including computer viruses, worms, Trojan horses, spyware, adware, rootkits, ransomware and other malicious programs. Download control is crucial in avoiding damage caused by the malware. However, criminals move fast, and antivirus software may not always recognize suspicious web sites. Consequently, further sophistication is desirable for recognizing dangerous situations.

BRIEF DESCRIPTION

The present invention seeks to provide an improved apparatus, method, computer readable medium, client apparatus, and trusted source or server apparatus.

According to an aspect of the present invention, there is provided an apparatus as specified in claim 1.

According to another aspect of the present invention, there is provided a method as specified in claim 11.

According to another aspect of the present invention, there is provided a computer readable medium as specified in claim 20.

According to another aspect of the present invention, there is provided a client apparatus as specified in claim 21.

According to another aspect of the present invention, there is provided a trusted source or server apparatus as specified in claim 22.

According to another aspect of the present invention, there is provided another apparatus as specified in claim 23.

LIST OF DRAWINGS

Example embodiments of the present invention are described below, by way of example only, with reference to the accompanying drawings, in which.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments of apparatuses, they are simplified block diagrams that only show some structures and functional entities. The connections shown in these Figures are logical connections; the actual physical connections may be different. Interfaces between the various elements may be implemented with suitable interface technologies, such as a message interface, a method interface, a sub-routine call interface, a block interface, or any hardware/software means enabling communication between functional sub-units. It is apparent to a person skilled in the art that the described apparatuses may also comprise other functions and structures. It should be appreciated that details of some functions, structures, and the protocols used for communication are irrelevant to the actual invention. Therefore, they need not be discussed in more detail here. Although the apparatuses have been depicted as separate single entities, different parts may be implemented in one or more physical or logical entities.

Figure 1:
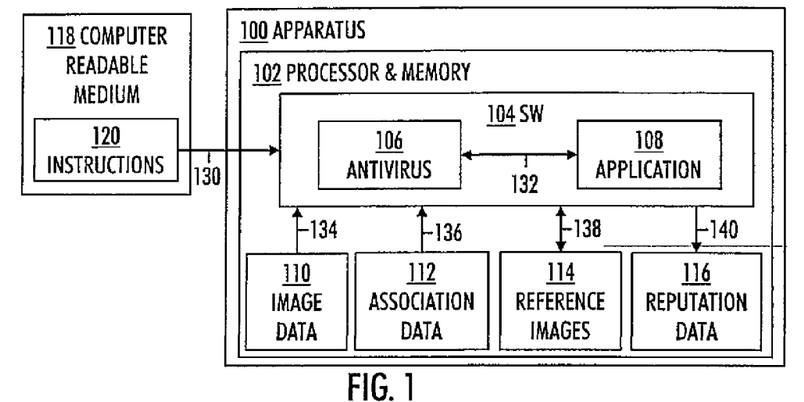
FIGS. 1, 2, 3, 4, 5 and 6 are simplified diagrams illustrating various example embodiments of an apparatus.

FIG. 1 illustrates an example embodiment of an apparatus 100. The apparatus 100 may be any electronic apparatus capable of processing data. A non-exhaustive list of the types of the apparatus 100 includes: an electronic digital computer, a desktop computer, a portable computer, a laptop computer, a tablet computer, a smartphone, a mobile phone, or any other electronic apparatus requiring malicious object detection. The apparatus 100 may employ an operating system such as Android, Microsoft Windows, Microsoft Windows Phone, Apple iOS, Apple Mac OS X, Linux, or Symbian, for example.

The apparatus 100 comprises one or more processors 102 and one or more memories 102 including computer program code 104. The processor 102 and the memory 102 may be implemented by electronic circuitry.

The term 'processor' refers to a physical device that is capable of processing data in a computer or other digital electronic device. Depending on the processing power needed, the apparatus 100 may comprise several processors 102 such as parallel processors or one or more multicore processors. A non-exhaustive list of implementation techniques for the processor 102 includes, but is not limited to: logic components, standard integrated circuits, application-specific integrated circuits (ASIC), system-on-a-chip (SoC), application-specific standard products (ASSP), microprocessors, digital signal processors, special-purpose computer chips, and field-programmable gate arrays (FPGA).

The term 'memory' refers to a physical device that is capable of storing the computer program code 104 and data on a temporary or permanent basis for use in a computer or other digital electronic device. In an example embodiment, the term 'memory' refers to working memory (also known as primary storage, main memory or internal storage) directly accessible to the processor. In an example embodiment, the working memory may be implemented as a random-access memory (RAM), such as a dynamic RAM, DRAM.

As illustrated in FIG. 1, the computer program code 104 may be implemented by suitable software. In an example embodiment, the computer program code 104 comprises antivirus software 106 and application software 108 as separate software entities communicating 132 with each other. The application software 108 may be a web browser, a peer-to-peer client, or any other software application requiring malicious object detection. In an example embodiment, the antivirus 106 includes a plug-in that is loaded into the application software 108 for facilitating the communication 132. In another example embodiment, the antivirus 106 comprises a plug-in module for a web browser 108, and the communication 132 is implemented between the plug-in module 106 and the web browser 108, whereupon the image data 110, for example, is obtained 134 from within the web browser 108. However, alternatively, the antivirus 106 and the application 108 functionalities may be combined within a single software entity as well. Consequently, the antivirus 106 functionality may be a part of the application software 108.

The one or more memories 102 and the computer program code 104 are configured to, with the one or more processors 102, cause the apparatus 100 at least to perform: obtain 134 image data 110, and obtain 136 association data 112 relating to the image data 110.

In an example embodiment, the one or more memories 102 and the computer program code 104 are further configured to, with the one or more processors 102, cause the apparatus 100 further to perform: obtain 134 the image data 110 by at least one of the following:
- download 134 the image data 110 from a resource identified by a uniform resource identifier (URI);
- download 134 the image data 110 from a resource identified by a uniform resource locator (URL);
- download 134 the image data 110 from a resource identified by code of a web page;
- download 134 the image data 110 from a resource indicated by a web browser 108;
- download 134 the image data 110 from a resource indicated by a network driver 104;
- obtain 134 the image data 110 from a web browser 108.

In an example embodiment, the one or more memories 102 and the computer program code 104 are further configured to, with the one or more processors 102, cause the apparatus 100 further to perform: obtain 136 the association data 112 by at least one of the following:
- obtain 136 the association data 112 as a uniform resource identifier;
- obtain 136 the association data 112 as a uniform resource locator;
- obtain 136 the association data 112 as a domain name;
- obtain 136 the association data 112 from code of a web page;
- obtain 136 the association data 112 from a web browser 108;
- obtain 136 the association data 112 from a network driver 104;
- obtain 136 the association data 112 from a web browser 108.

Furthermore, the one or more memories 102 and the computer program code are configured 104 to, with the one or more processors 102, cause the apparatus 100 at least to perform: identify 138 the image data 110 as corresponding to an identified image among known reference images 114, and set 140 reputation data 116 of the association data 112 as suspicious, if the association data 112 does not match acceptable associations for the identified image.

In principle, the apparatus 100 processes the following variables: the image data 110, the association data 112 relating to the image data 110, the known reference images 114, the identified image, the reputation data 116 of the association data 112, and acceptable associations for the (identified) image. The reputation data 116 of the association data 112 is simply the reputation of the association data 112, i.e. a simple statement of the safety of the association: suspicious, clean/safe, malicious/not safe. Normal sites are reputable, but criminal sites may be notorious. The suspicious means that the association is not recognized as safe, and, consequently, it is likely malicious/not safe, although in some rare cases, it may finally turn out clean/safe.

Figure 3:
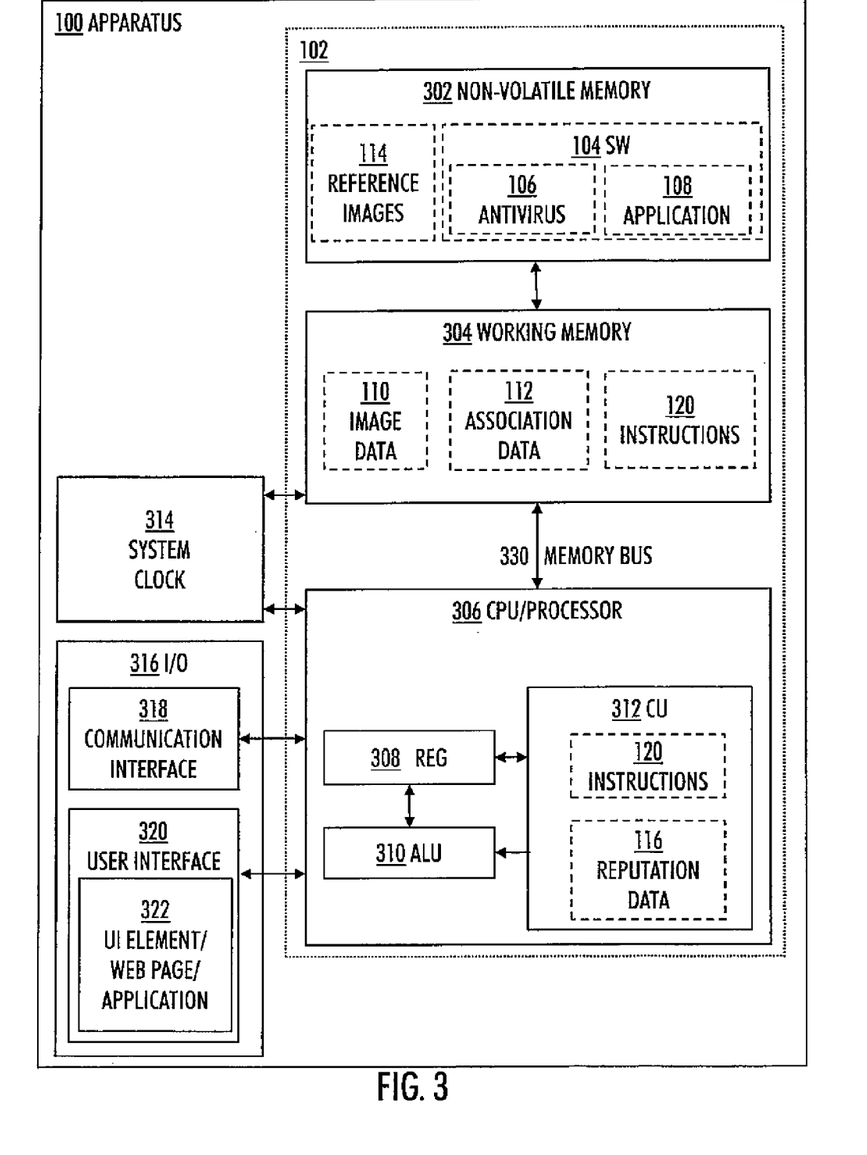

In an example embodiment, see FIG. 3, the image data 110 and the association data 112 relate to:
- a displayable user interface element 322, such that the image data 110 determines the displayed image of the user interface element 322, and the association data 112 relates to an action performed when the user interface element 322 is manipulated;
- a visual appearance of a web page 322, such that the image data 110 determines the displayed image of the web page 322, and the association data 112 relates to an action performed when the web page 322 is manipulated; or
- a visual appearance of an application 322, such that the image data 110 determines the displayed image of the application 322, and the association data 112 relates to an action performed when the application 322 is manipulated.

At least some example embodiments solve the problem of how to identify malicious object, a file, a web page, URL link with picture, or other screen element when the only information available is the image data 110 of the element and knowledge that the element visually matches with something that has an association. As an example, consider a video display element in an alleged web page of a well-known company that actually leads to another URL than the official webpage of that company. But, as there is no classification/reputation data for the URL, the user cannot be alarmed that the image is a scam.

In at least some example embodiments, image match may be used to find out screen elements (such as the user interface elements, web pages, or applications) that match to something that is well-known, for example a video player, bank web page, screen icon, logo, etc. Furthermore, common accepted associations for the element are found out: a specific video element has to point to URL that is in a certain domain space, for example.

If the association for screen element is known, anomalies may be detected: a link pointing to unknown domain or bank web page that is in completely unassociated domain, for example.

Figure 7:
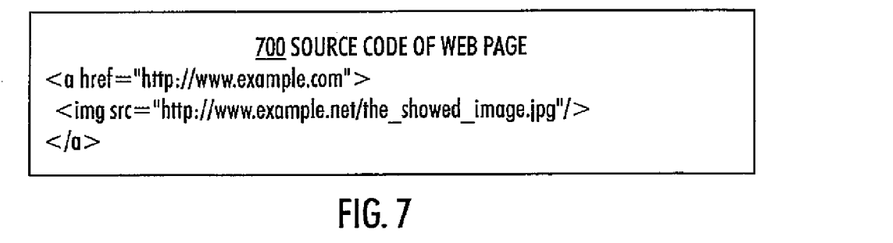
FIG. 7 illustrates an example embodiment of a source code of a web page.

Modern code analysis systems permit to understand the behaviour of any software through simple code inspection. As an example a simple piece of HTML code 700 is shown in FIG. 7. It is relatively common to encounter these three lines of code while inspecting the source code of a web page.

A web browser will interpret the source code 700, and return to the user the web page content rendered in a readable format.

From the inspection of this fragment of code 700, it is possible to deduce that the user will see an image named "the_showed_image.jpg". If the user will interact with this image through a simple mouse click, the browser will be redirected to the following URL: http://www.example.com.

This information may not be enough to make any decision about the level of harm caused by the user's interaction with the web object. This is because if the reputation of the two web URLs is not known, no more conclusions can be reached.

Additionally, it is possible to analyse the image as explained earlier. In an example embodiment, the analysis is performed through computer vision technologies, with which patterns may be identified from the image. In an example embodiment, the one or more memories 102 and the computer program code 104 are further configured to, with the one or more processors 102, cause the apparatus 100 further to perform: in order to identify the image data 110 as corresponding to an identified image among known reference images 114, search for common image patterns within the image data 110, and/or perform an optical character recognition for the image data 110. Optical character recognition (OCR) is the electronic conversion of an image into machine-encoded text. OCR is a field of research in pattern recognition, artificial intelligence and computer vision.

Figure 8:
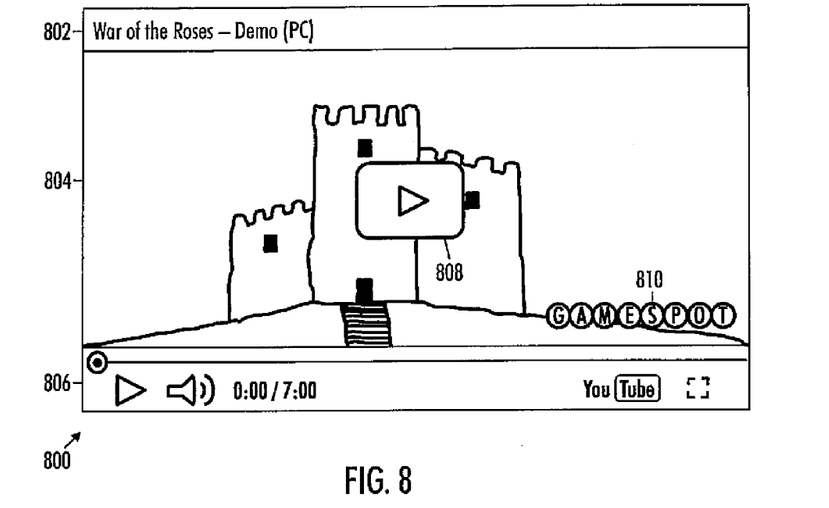
FIGS. 8, 9, 10, 11 and 12 illustrate example embodiments of an image analysis.

To give an example embodiment, let us take a look on how "the_showed_image.jpg" may look like in FIG. 8.

In the example embodiment of FIG. 8, the object 800 under analysis is misleading the user trying to look like a video object while in reality it is an image linking to an external URL. As can be seen in FIG. 8, the user sees a title bar 802 claiming that the image is a demo for a PC game called "War of the Roses". The image 804 shows a castle, and name of the alleged game-site 810 "Gamespot". Furthermore, the lower bar 806 looks as if it were a control bar for a YouTube site featuring the video. Finally, in the image 804 there is a control button 808 that looks like a "play" button for the video.

Taking advantage of the new information, it is possible to track down malicious attempts based on the visual feedback users receive from any computer based content. The same approach may be taken with different kind of images and different software technologies that make use of Graphical User Interfaces (GUIs).

In an example embodiment, common image patterns are searched for inside the images displayed on the user's screen. These patterns are images, or small portions of them, that are well known to the users by their purpose/context.

Figure 9:
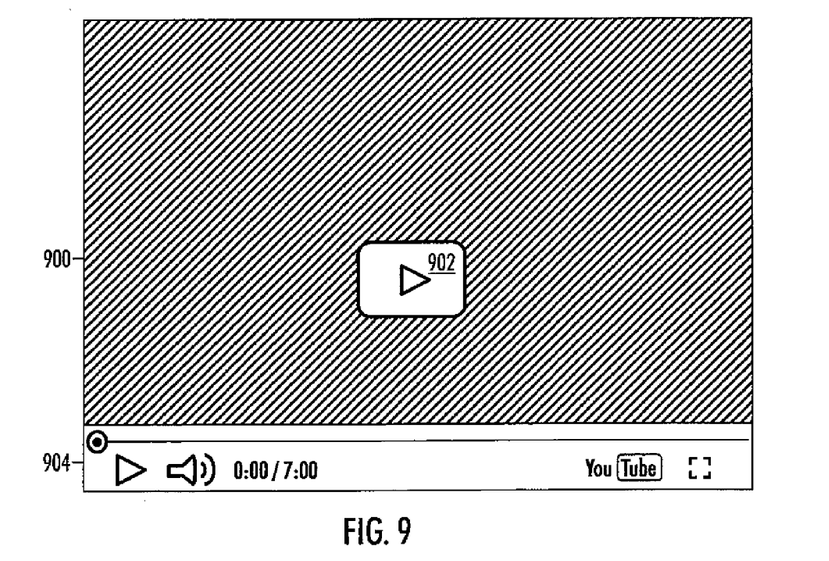

To continue from the example of FIG. 8, let us take a look at "the_showed_image.jpg" focusing only on the patterns of the image in FIG. 9.

The diagonal pattern 900 denotes the part of the image that has been removed to make it easier to find these patterns, i.e. the title bar 802 and the image 804 have been removed.

It is possible to notice two portions, the "play" button 902 and the lower control bar 904 of the image, which are claiming to recall to the user's mind a precise meaning: "what is displayed here, is a video web content".

Figure 10:
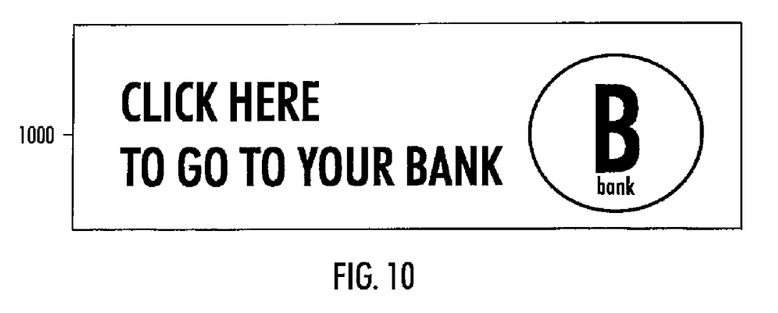
Figure 11:
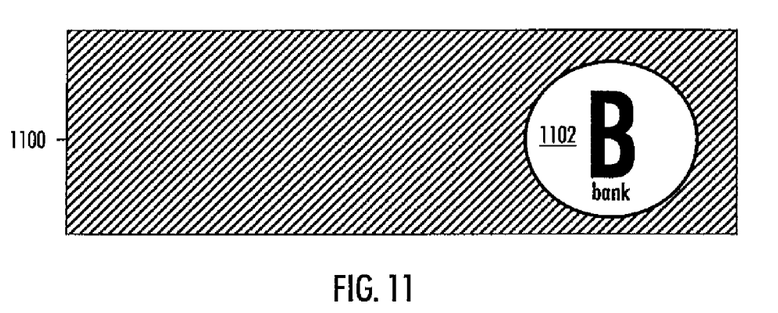
Figure 12:
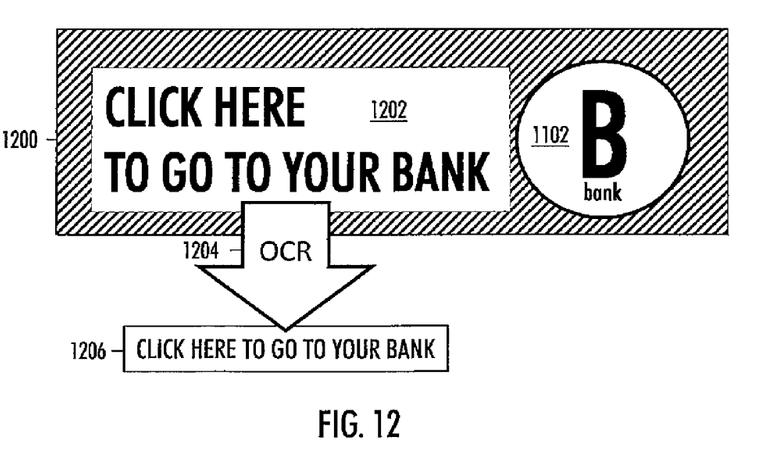

FIGS. 10, 11 and 12 illustrate another example embodiment. With the same HTML code of FIG. 7, the image 1000 displayed is as shown in FIG. 10. In this case the object is using a logo of a bank and a simple sentence. The message is clear: "if you click here, you will navigate to the website of the bank B".

This case is more subtle compared to FIG. 8 as the image in FIG. 10 is clearly intended to redirect the user to another URL (obviously not the official URL of the bank): combining this information with the HTML code would not give useful information.

In FIG. 11, the diagonal pattern denotes the part 1100 of the image that has been removed to make it easier to find patterns. A logo 1102 of a well-known bank may be identified.

FIG. 12 illustrates that the diagonal pattern part 1200 is again removed, but, besides the logo 1102, more useful information may be obtained using an optical character recognition (OCR) tool 1204 to extract word/sentence 1202 from the image. The result of the OCR tool 1204 is the sentence 1206 "click here to go to your bank".

Combining the acquired information, the logo 1102 and the sentence 1206, it is possible to arrive at a conclusion that the image of FIG. 10 is trying to deceive the user letting him/her thinking that clicking on the image will redirect the browser to a web page of the bank.

Furthermore, inspecting the code it is possible to identify the URL the image is redirecting the web browser to: http://www.example.com, clearly not the official web page of the bank.

Same procedure may be applied to any object displayed to the user on the screen: a desktop icon, a menu field, a widget, etc.

Figure 2:
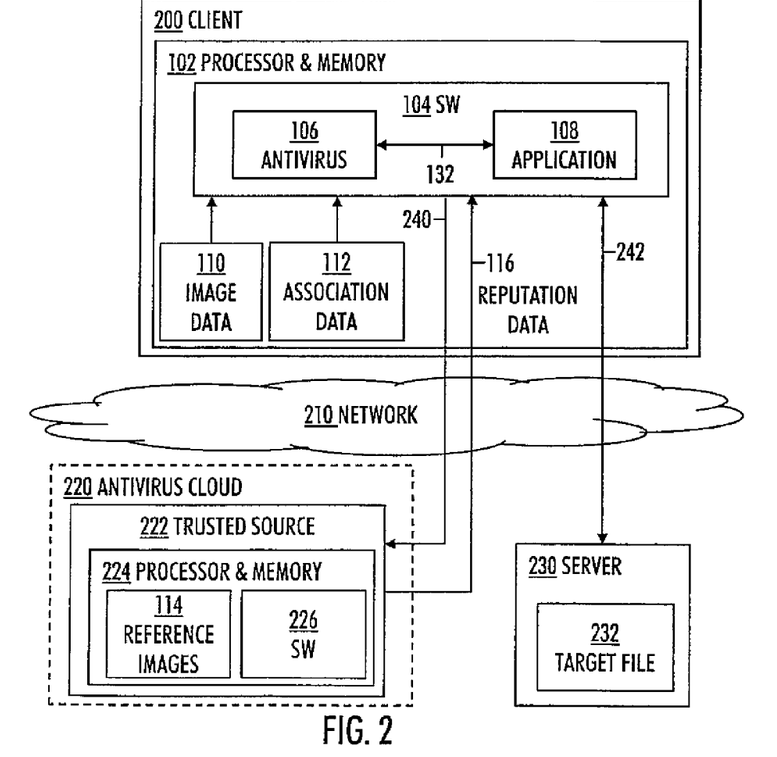

As illustrated in FIG. 1, the apparatus 100 may be an independent device. However, the apparatus functionality may also be implemented in a system of interacting parts. FIG. 2 illustrates an example embodiment of such a system including a client apparatus 200 communicating 240, 116, 242 over a network 210 with a trusted source 222 and a server 230.

The network 210 may include various wired/wireless standard/non-standard/proprietary communication networks such as a computer network, a private network, an IP-based network (TCP/IP=Transmission Control Protocol/Internet Protocol), the Internet, the telephone network including the public switched telephone network, any mobile phone network, regardless of the generation (such as 2G, 3G, 4G, beyond 4G, etc.) such as GSM (Global System for Mobile Communications), GPRS (General Packet Radio Service), EGPRS (Enhanced GPRS), WCDMA (Wideband Code Division Multiple Access), UMTS (Universal Mobile Telephone System), 3GPP (The 3rd Generation Partnership Project), IMT (International Mobile Telecommunication), LTE (Long Term Evolution, LTE-A (LIE-Advanced), and other radio systems (in their present forms and/or in their evolution forms), such as WLAN (Wireless Local Area Network) based on IEEE (Institute of Electrical and Electronics Engineers) 802.11 standard or its evolution versions (IEEE 802.11ac etc.), WiMAX (Worldwide Interoperability for Microwave Access, or Wi-Fi, for example.

The trusted source 222 refers to a reliable party keeping track of reputation of various web sites. The trusted source 222 may operate in an antivirus cloud 220, which refers to antivirus software operating in a cloud computing environment for prevention, detection, and removal of malware, whereby shared resources, software, and information are provided to the antivirus (software) 106 of the client 100 as a utility over the network 210. Naturally, the antivirus cloud 220 may be implemented according to the more traditional client-server computing model as well. Furthermore, the trusted source 222 may also be implemented as a stand-alone reputation server without any antivirus cloud 220.

The server 230 is a part of the client-server computing model that acts as distributed application which partitions tasks or workloads between the provider of a resource or service, called server 230, and the service requester, called client 100. The server computer 230 is a host that is running one or more server programs which share their resources with clients 100. The client 100 may request a server's content or service function, in our case a target file 232 as indicated by the association data 112. The client 100 therefore initiates a communication session with the server 230 which awaits incoming requests. The server 230 may also operate according to the cloud computing model. Additionally, or alternatively, the server may also operate according to the peer-to-peer (P2P) computing model. A pure peer-to-peer system consists of equal peer nodes that simultaneously function as both clients 100 and servers 230. In a hybrid peer-to-peer system, a need for a special role is recognized: one or several nodes, but not all nodes, have a special role, which serves the other nodes of the peer-to-peer system. In FIG. 2, the server 230 may have the special role serving the client 100. Additionally, the client 100 may also serve as a server to another client thereby sharing the downloaded target file 232.

The client apparatus 100 comprises one or more processors 102, and one or more memories 102 including computer program code 104. The processor 102 and the memory 102 may be implemented by electronic circuitry. The one or more memories 102 and the computer program code 104 are configured to, with the one or more processors 102, cause the apparatus 100 at least to perform: obtain image data 110, obtain association data 112 relating to the image data 110, cause transmission 240 of the image data 110 to a trusted source or server apparatus 222, cause transmission 240 of the association data 112 to the trusted source/the server apparatus 222, obtain reputation data 116 of the association data 112 from the trusted source/the server apparatus 222 in response to the transmission 240 of the image data 110 and the association data 112, and control use of the association data 112 on the basis of the reputation data 116.

The last operation of the client apparatus 200, the control for the use of the association data 112 on the basis of the reputation data 116 may be implemented into the apparatus 100 of FIG. 1 as well. In the context of FIG. 2, this control functionality may, for example, control use 242 of a target file 232 residing in the server 230 and being addressed by the association data 112.

The trusted source/server apparatus 222 comprises one or more processors 224, and one or more memories 224 including computer program code 226. The processor 224 and the memory 224 may be implemented by electronic circuitry. The one or more memories 224 and the computer program code 226 are configured to, with the one or more processors 224, cause the apparatus 222 at least to perform: obtain image data 110 from a client apparatus 200, obtain association data 112 relating to the image data 110 from the client apparatus 200, identify the image data 110 as corresponding to an identified image among known reference images 114, set reputation data 116 of the association data 112 as suspicious, if the association data 112 does not match acceptable associations for the identified image, and cause transmission of the reputation data 116 of the association data 112 to the client apparatus 200 in response to obtaining the image data 110 and the association data 112.

Naturally, the described distribution of functionality between the client apparatus 200 and the trusted source/ server apparatus 222 is just one example embodiment, as the distribution may be adjusted based on the system requirements.

In an example embodiment illustrated in FIG. 3, the apparatus 100 (or client 200, or trusted source/server apparatus 222) may be an electronic digital computer, which may comprise a non-volatile memory 302, a working memory 304, a processor 306, a system clock 314 and an input/output 316 including a communication interface 318 and a user interface 320. Naturally, the computer may comprise a number of other peripheral devices, not illustrated here for the sake of clarity.

In an example embodiment, the system clock 314 constantly generates a stream of electrical pulses, which cause the various transferring operations within the computer to take place in an orderly manner and with specific timing.

In an example embodiment, the processor 306 may be implemented as a microprocessor implementing functions of a central processing unit (CPU) on an integrated circuit. The CPU 306 is a logic machine executing a computer program 104, which comprises program instructions 120. The computer program 104 may be coded as a computer program using a programming language, which may be a high-level programming language, such as C, C++, or Java, or a low-level programming language, such as a machine language, or an assembler. There are many ways to structure the program 104. In an example embodiment, the operations of the program may be divided into functional modules, sub-routines, methods, classes, objects, applets, macros, etc., depending on the software design methodology and the programming language used. In modern programming environments, there are software libraries, i.e. compilations of ready-made functions, which may be utilized by the program for performing a wide variety of standard operations.

The CPU 306 may comprise a set of registers 308, an arithmetic logic unit (ALU) 310, and a control unit (CU) 312. The control unit 312 is controlled by a sequence of instructions 120 transferred to the CPU 306 from the working memory 304. The working memory 304 is directly or indirectly connected to the CPU 306 via a memory bus 330 including two buses: an address bus and a data bus. The CPU 306 sends a memory address indicating the desired location of data (=data such as the image data 110, association data 112, reputation data 116, and instructions 120) number through the address bus, whereupon the CPU 306 reads or writes the data itself from/to the working memory 304 using the data bus.

The control unit 312 may contain a number of microinstructions for basic operations. The implementation of the microinstructions may vary, depending on the CPU design. The microprocessor 306 may also have an operating system (such as general-purpose operating system, a dedicated operating system of an embedded system, or a real-time operating system), which may provide the computer program 104 with system services. During running of the program 104, the instructions 120 are transferred via the memory bus 330 from the working memory 304 into the control unit 312, wherein usually a portion of the instructions 120 resides and controls the operation.

In an example embodiment, the non-volatile memory 302 retains the stored information even when not powered. Examples of non-volatile memory include read-only memory (ROM), flash memory, magnetic computer storage devices such as hard disk drives, and optical discs. As is shown in FIG. 3, the non-volatile memory 302 may store both data 114 and the computer program 104 comprising the instructions 120.

An example embodiment, illustrated in FIG. 1, provides a computer readable medium 118 comprising a set of instructions 120, which, when executed on the apparatus 100 cause the apparatus 100 to perform the required operations. In an example embodiment, the instructions 120 may be in source code form, object code form, or in some intermediate form. The computer-readable medium 118 may comprise at least the following: any entity or device capable of carrying 130 the instructions 120 to the apparatus 100, a record medium, a computer memory, a read-only memory, an electrical carrier signal, a telecommunications signal, and a software distribution medium. In some jurisdictions, depending on the legislation and the patent practice, the medium 118 may not be the telecommunications signal. In an example embodiment, the medium 118 may be a non-transitory computer readable storage medium.

Figure 4:
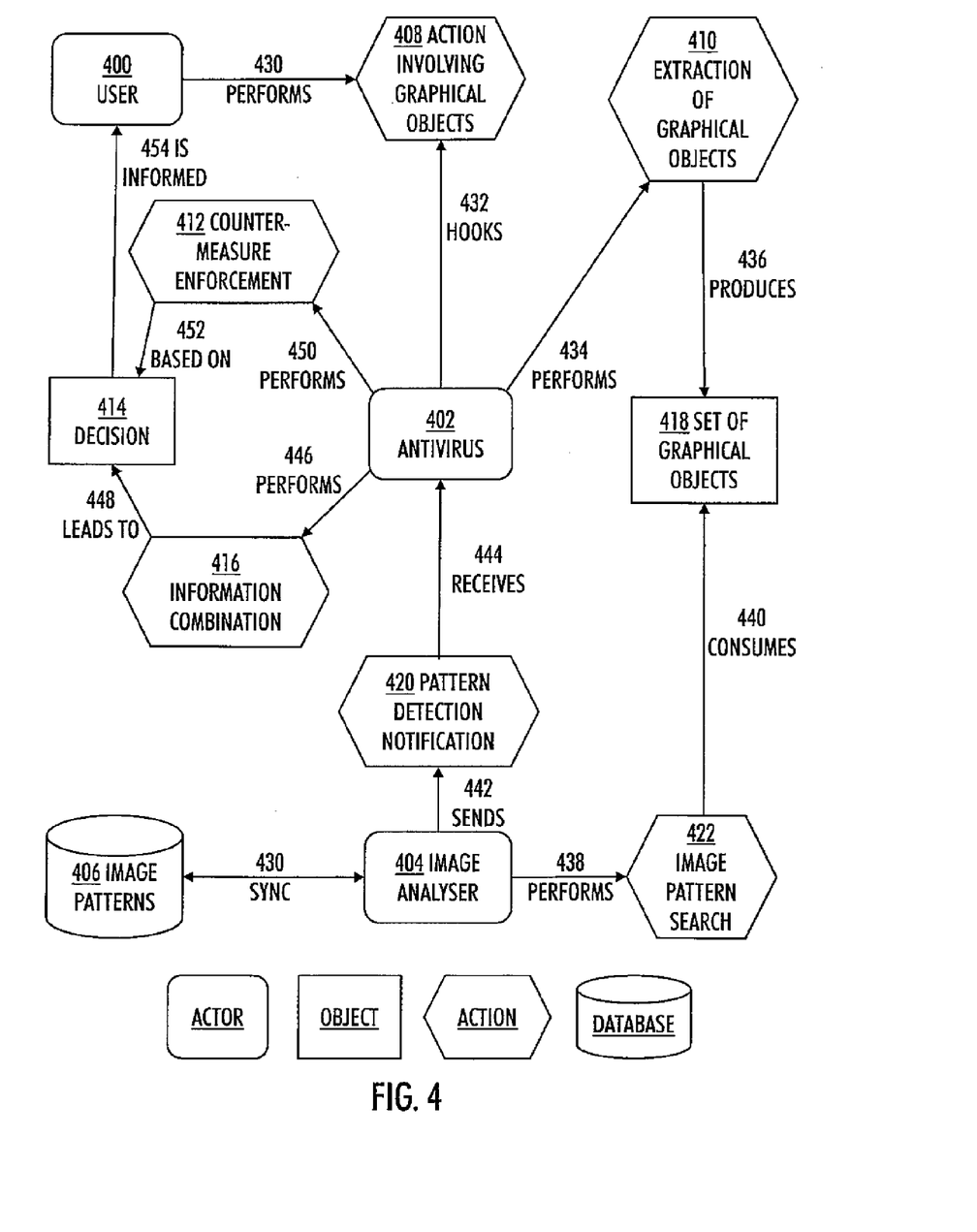
Figure 5:
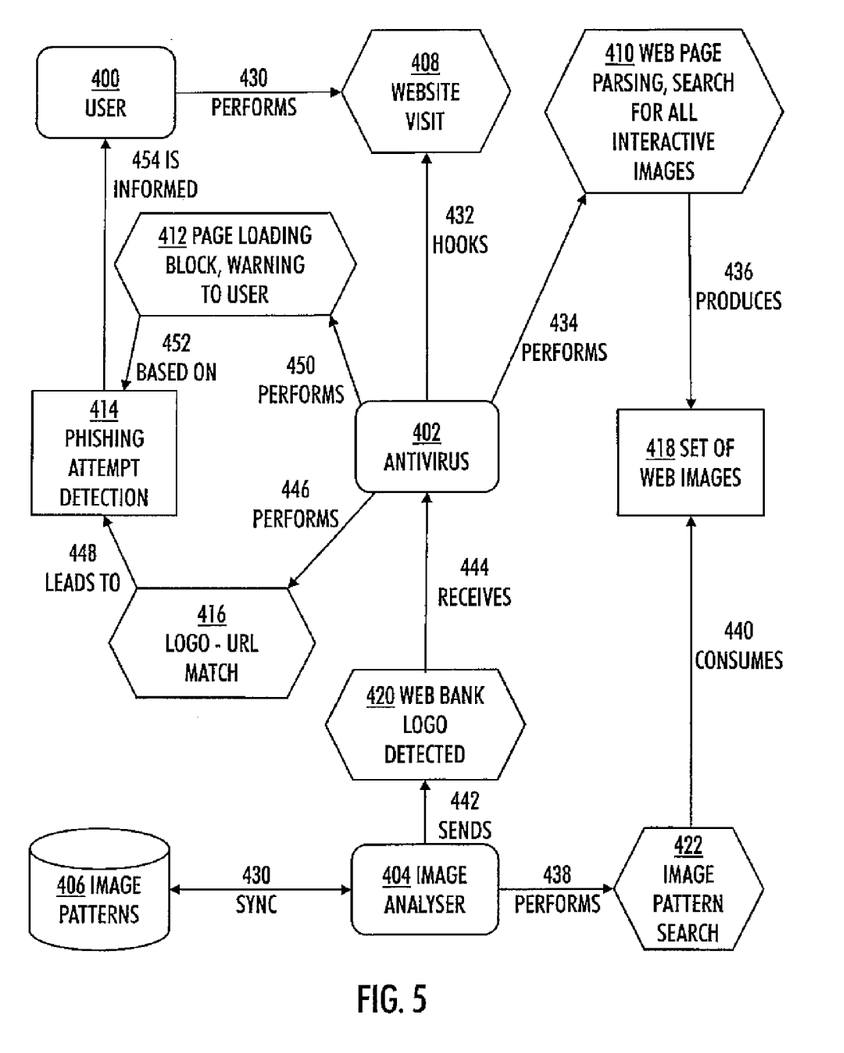

With reference to FIGS. 4 and 5 let us next study further example embodiments of the apparatus 100.

FIG. 4 shows an example embodiment from the user's first interaction with a graphical object to the decision taken by the software protection system.

Rounded rectangle denotes an actor, normal rectangle denotes an object, hexagon denotes an action, and the remaining symbol denotes a database.

In FIG. 4, the elements 400-422 are linked together by directed edges 430-454 describing the connections between the elements. The edges 430-454 represent an example embodiment of the temporal order of the actions taking place to make the decision.

A user 400 performs 430 an action 408 involving graphical objects, and an antivirus 402 hooks 432 to the action 408 involving the graphical object.

The antivirus 402 performs 434 an extraction 410 of graphical objects, which produces 436 a set 418 of graphical objects.

Initially, an image analyser 404 synchronizes 430 to a database 406 of image patterns. The image analyser 404 performs 438 an image pattern search 422 consuming 440 the set 418 of the graphical objects, whereupon the image analyser 404 sends 442 a pattern detection notification 420 that is received 444 by the antivirus 402.

The antivirus 402 performs 446 information combination 416 leading 448 to a decision 414. Additionally, the antivirus 402 performs 450 countermeasure enforcement 412. The decision 414 is based 452 on the countermeasure enforcement 412.

Finally, the user 400 is informed 454 of the decision 414.

In FIG. 5, the sequence of FIG. 4 is implemented as an example embodiment with the user 400 visiting a malicious web page.

The user 400 performs 430 a website visit 408, and the antivirus 402 hooks 432 to the website visit 408.

The antivirus 402 performs 434 web page parsing and a search 410 for all interactive images, which produces 436 a set 418 of web images.

Initially, the image analyser 404 synchronizes 430 to the database 406 of image patterns. The image analyser 404 performs 438 an image pattern search 422 consuming 440 the set 418 of the web images, whereupon the image analyser 404 sends 442 a web bank logo detection notification 420 that is received 444 by the antivirus 402.

The antivirus 402 performs 446 logo—URL match 416 leading 448 to a phishing attempt detection 414. Additionally, the antivirus 402 performs 450a countermeasure enforcement 412 involving a page loading block and a warning to the user. The phishing attempt detection 414 is based 452 on the countermeasure enforcement 412.

Finally, the user 400 is informed 454 of the phishing attempt detection 414.

Figure 6:
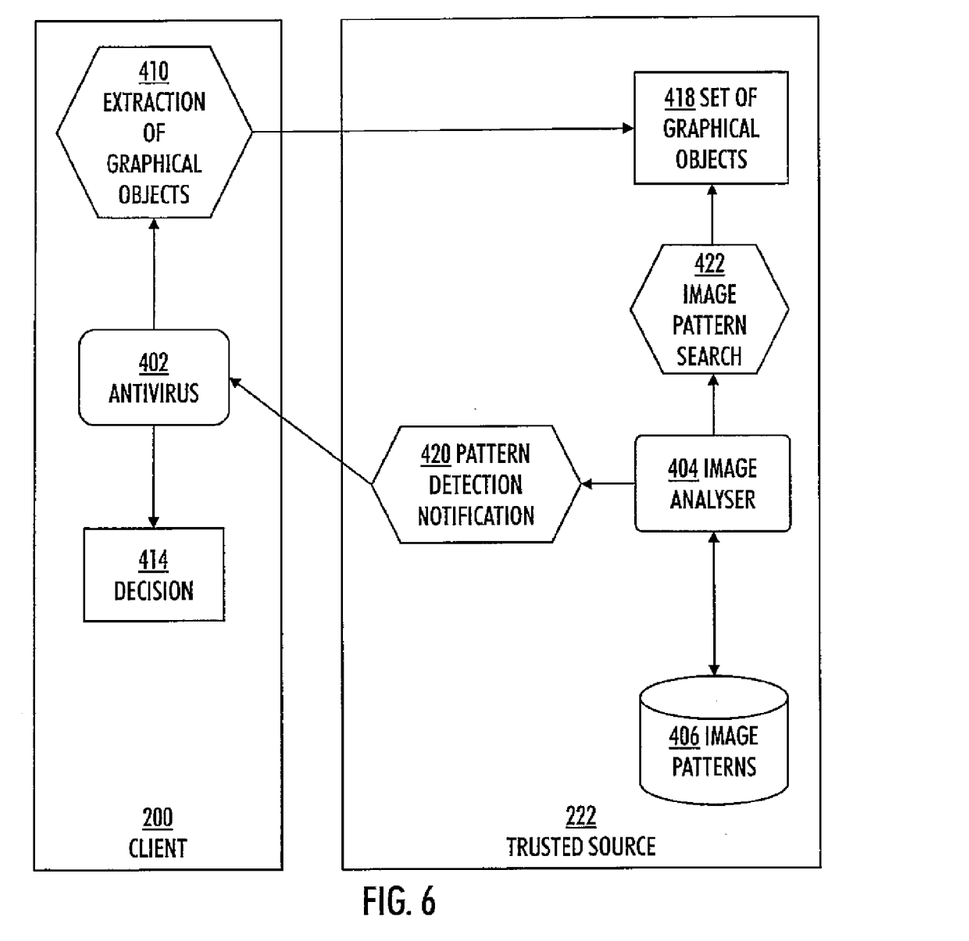

FIG. 6 shows a simplified view of the same architecture as in FIGS. 4 and 5 but implementing the concept in a distributed platform between the client 200 and the trusted source/server apparatus 222. The antivirus 402 performs the extraction 410 of the graphical objects, which produces the set 418 of the graphical objects. The image analyser 404 synchronizes to the database 406 of the image patterns. The image analyser 404 sends the pattern detection notification 420 that is received by the antivirus 402. The decision 414 is made by the antivirus 402. In an example embodiment, the decision making 414 may be moved to the trusted source/server apparatus 222 side as well: the client 200 side may then provide both the images and the related code (the image and the related URL in a web page case, for example).

In an example embodiment, the sequence may be as follows:
1. User goes to a shady web page that contains something looking like a safe video link.

2. Antivirus parses the web page and goes through all URLs which have images that are used to build the page.

3. One of links has an image of a video pointing to *.example.* domain.

4. Antivirus queries image URLs from F-Secure server, sending image URL and association in the system (URL in this case).

5. F-Secure server downloads images.

6. F-Secure server feeds the images to an image recognizer, which compares images to a reference set of known images, and identifies one of the images as matching with a known video service entity in the F-Secure reputation database.

7. The known associations are checked from the F-Secure database: domain: *.example.*, flash plugin, HTML5 video plugin, Google analytics links, etc.

8. It is checked to what the image element is associated in the web page source code.

9. It is determined that *.example.* does not match acceptable associations for the identified video service.

10. The URL is rated as suspicious in the antivirus.

The same idea may be used for example police logo in ransomware, or net bank web page, etc. The operation may also be performed in the client side for a limited set of reference images and associations. Doing the work on the client allows warning the first user, but consumes more resources on the client. Doing it in the server allows broader comparison set, but at the cost of the first user perhaps getting hit.

Next, example embodiments of a method will be described with reference to FIGS. 13, 14, 15, 16, 17 and 18. Other functions, not described in this application, may also be executed between the operations or within the operations. Some of the operations or parts of the operations may also be left out or replaced by a corresponding operation or part of the operation.

Figure 13:
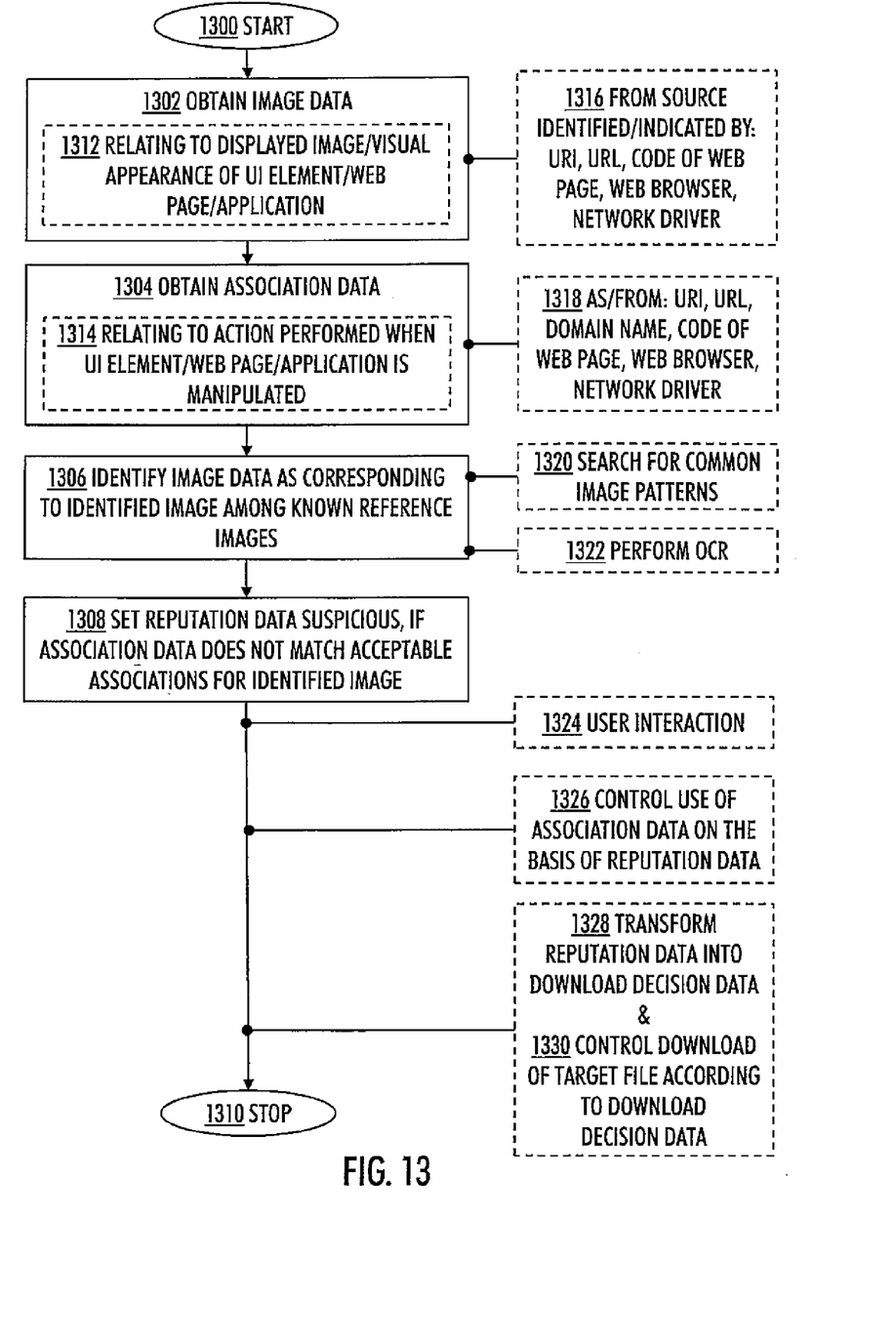
FIGS. 13, 14, 15, 16, 17 and 18 are flow charts illustrating example embodiments of a method.

The method starts in 1300.

In 1302, image data is obtained.

In 1304, association data relating to the image data is obtained.

In 1306, the image data is identified as corresponding to an identified image among known reference images.

In 1308, reputation data of the association data is set as suspicious, if the association data does not match acceptable associations for the identified image.

The method ends in 1310.

The embodiments of the earlier described apparatus 100, client apparatus 200, and/or trusted source/server apparatus 222 may also be used to enhance the method. In an example embodiment, the method may be implemented in the apparatus 100, client apparatus 200, and/or trusted source/server apparatus 222 described earlier. In an embodiment, a computer program comprises instructions 120, which, when loaded into the apparatus 100/200/222, cause the apparatus 100/200/222 to perform the described process and its further example embodiments. In an embodiment, a computer readable storage medium comprises the computer program.

Next, further example embodiments of the method will be described. These example embodiments may be freely combined with each other in order to produce further example embodiments for the method, but also for the apparatus 100/200/222.

In an example embodiment, the image data and the association data relate 1312, 1314 to:

a displayable user interface element, such that the image data determines 1312 the displayed image of the user interface element, and the association data relates 1314 to an action performed when the user interface element is manipulated;

a visual appearance of a web page, such that the image data determines 1312 the displayed image of the web page, and the association data relates 1314 to an action performed when the web page is manipulated; or a visual appearance of an application, such that the image data determines 1312 the displayed image of the application, and the association data relates 1314 to an action performed when the application is manipulated.

In an example embodiment of 1316, the image data is obtained 1302 by at least one of the following:

downloading the image data from a resource identified by a uniform resource identifier;

downloading the image data from a resource identified by a uniform resource locator;

downloading the image data from a resource identified by code of a web page;

downloading the image data from a resource indicated by a web browser; downloading the image data from a resource indicated by a network driver;

obtaining the image data from a web browser.

In an example embodiment of 1318, the association data is obtained 1304 by at least one of the following:

obtaining the association data as a uniform resource identifier;

obtaining the association data as a uniform resource locator;

obtaining the association data as a domain name;

obtaining the association data from code of a web page;

obtaining the association data from a web browser;

obtaining the association data from a network driver;

obtaining the association data from a web browser.

In an example embodiment, the method further comprises: in order to identify 1306 the image data as corresponding to an identified image among known reference images, searching 1320 for common image patterns within the image data, and/or performing 1322 an optical character recognition for the image data.

In an example embodiment, the method further comprises: controlling 1326 use of the association data on the basis of the reputation data.

In an example embodiment, the method further comprises: transforming 1328 the reputation data into a download decision data of a target file to be downloaded on the basis of the association data; and controlling 1330 download of the target file according to the download decision data.

In an example embodiment, the method further comprises: performing 1324 user interaction in relation controlling 1326 use of the association data on the basis of the reputation data. The contents of the reputation data, for example, may be communicated to the user, and the user may make the final decision regarding the use of the association data.

Figure 14:
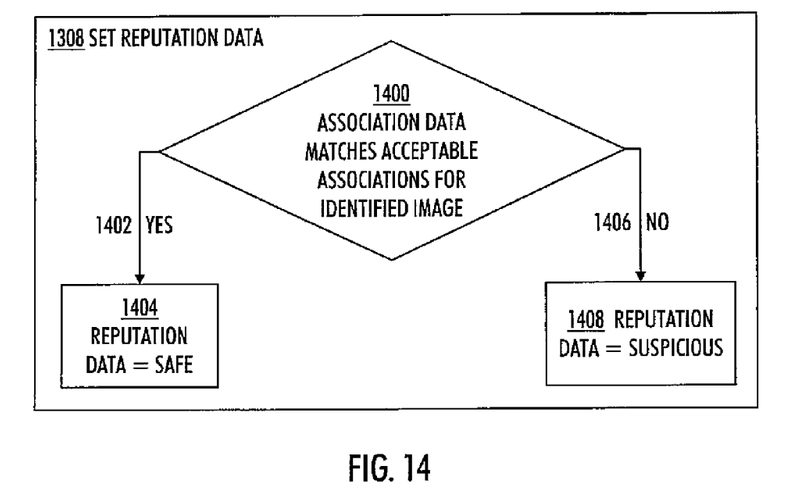
Figure 15:
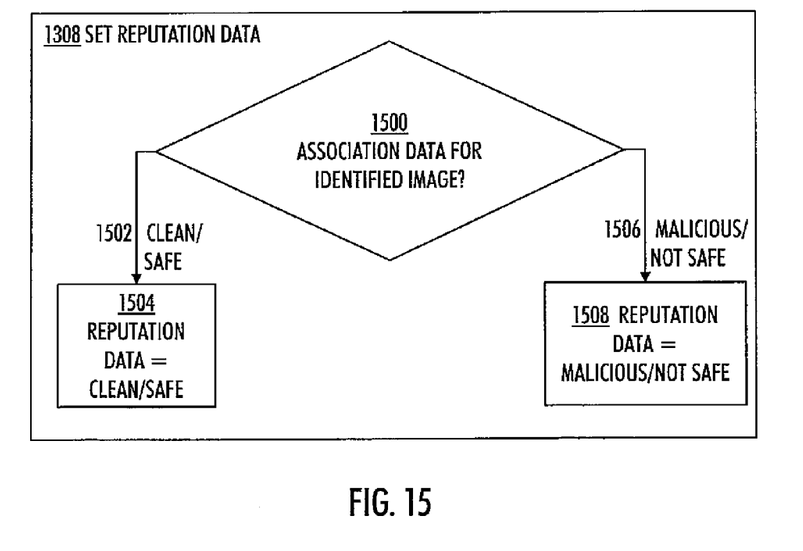

With reference to FIGS. 14 and 15, let us study setting 1308 the reputation data in more detail.

In FIG. 14, it is tested 1400 whether the association data matches the acceptable associations for the identified image. If the association data does not match 1406 acceptable associations for the identified image, the reputation data of the association data is set 1408 as suspicious. If the association data matches 1402 acceptable associations for the identified image, the reputation data of the association data is set 1404 as safe.

In FIG. 15, the association data for the identified image is tested 1500. If the association data for the identified image is marked as clean or safe 1502, the reputation data is set 1504 as clean or safe. If the association data for the identified image is marked as malicious or not safe 1506, the reputation data is set 1508 as malicious or not safe.

Figure 16:
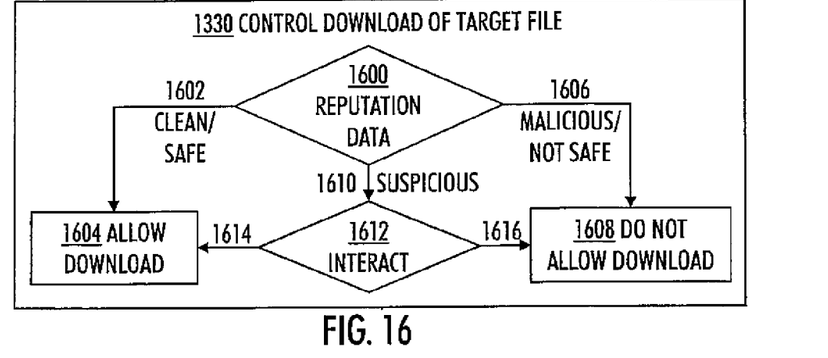

In an example embodiment, illustrated in FIG. 16, the method further comprises: controlling 1330 the download of the target file according to the download decision data such that if the reputation data 1600 of the association data indicates that the target file is clean or safe 1602, download is allowed 1604, or if the reputation data 1600 indicates that the target file is malicious or not safe 1606, download is not allowed 1608. If the reputation data 1600 indicates that the target file is suspicious 1610, user interaction 1612 may be used to make the selection, i.e. a user is queried whether the download is allowed or not allowed: the user may select 1614 to allow 1604 the download or select 1616 not to allow 1608 the download.

Figure 17:
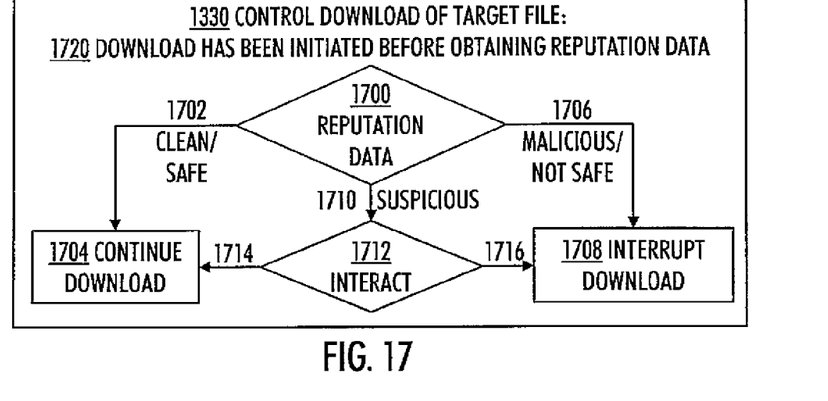

In an example embodiment, illustrated in FIG. 17, the method further comprises: if the download of the target file has been initiated 1720 before setting 1308 the reputation data 1700, controlling 1330 the download of the target file according to the download decision data such that the download is continued 1704 if the reputation data 1700 indicates that the target file is clean or safe 1702, or the download is interrupted 1708 if the reputation data 1700 indicates that the target file is malicious or not safe 1706, or if the reputation data 1700 indicates that the target file is suspicious 1710, query 1712 a user whether the download is continued 1714, 1704 or interrupted 1716, 1708.

Figure 18:
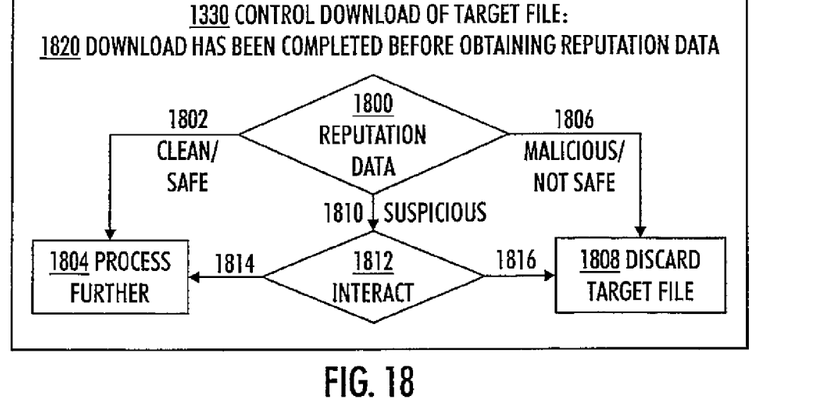

In an example embodiment, illustrated in FIG. 18, the method further comprises: if the download of the target file has been completed 1820 before setting 1308 the reputation data 1800, controlling 1330 the download of the target file according to the download decision data such that the downloaded target file is forwarded for further processing 1804 if the reputation data 1800 indicates that the target file is clean or safe 1802, or the downloaded target file is discarded 1808 if the reputation data 1800 indicates that the target file is malicious or not safe 1806, or if the reputation data 1800 indicates that the target file is suspicious 1810, query 1812 a user whether the downloaded target file is forwarded for further processing 1814, 1804 or discarded 1816, 1808.

The first example embodiment of FIG. 16 allows the antivirus 106 to prevent malicious (=target file 232 is contaminated with malware) download 242 from starting, thus preventing the infection of the apparatus 100/200. As there is no need to download the target file 232 first to perform the malware check, time, storage space and bandwidth are saved. There is also no need to waste computing resources of the apparatus 100/200 for scanning the target file 242.

The second and third example embodiments of FIGS. 17 and 18 allow the antivirus 106 to interrupt malicious (=target file 232 is infested with malware) download 242, or discard the malicious (=target file 232 is infested with malware) download 242, thus preventing the infection of the apparatus 100/200. Time of the user may be saved as there is no need to first wait for the reputation data 1700, 1800, 116, but the download 242 may be started immediately.

It will be obvious to a person skilled in the art that, as technology advances, the inventive concept can be implemented in various ways. The invention and its embodiments are not limited to the example embodiments described above but may vary within the scope of the claims.

The invention claimed is:

1. An apparatus comprising
one or more processors, and
one or more memories including computer program code,
the one or more memories and the computer program code configured to, with the one or more processors, cause the apparatus at least to perform:
obtain image data, which determines a displayed image of a user interface;
obtain association data included in the image data, wherein the association data comprises action instructions which are performed when the user interface is manipulated by a user;
identify the image data as corresponding to an identified image among known reference images, wherein, in order to identify the image data as corresponding to an identified image among known reference images, the apparatus is caused to search for image patterns within the image data, wherein the searching for image patterns within the image data is searching for patterns in the displayed image of the user interface displayed on a screen for the user with computer vision technology and the image patterns are images or portions of images that are known to the user by their purpose or context; and
set reputation data of the association data as suspicious, if the association data does not match acceptable associations for the identified image.

2. The apparatus of claim 1, wherein the displayed image of the user interface comprises at least one of:
a displayable user interface element;
a visual appearance of a web page; and
a visual appearance of an application.

3. The apparatus of claim 1, wherein the one or more memories and the computer program code are further configured to, with the one or more processors, cause the apparatus further to:
in order to identify the image data as corresponding to an identified image among known reference images, perform an optical character recognition for the image data.

4. The apparatus of claim 1, wherein the one or more memories and the computer program code are further configured to, with the one or more processors, cause the apparatus further to perform at least one of the following:
if the association data for the identified image is marked as clean or safe, set the reputation data as clean or safe;
if the association data for the identified image is marked as malicious or not safe, set the reputation data as malicious or not safe.

5. The apparatus of claim 1, wherein the one or more memories and the computer program code are further configured to, with the one or more processors, cause the apparatus further to perform:
control use of the association data on a basis of the reputation data.

6. The apparatus of claim 1, wherein the one or more memories and the computer program code are further configured to, with the one or more processors, cause the apparatus further to perform:
obtain the image data by at least one of the following:
download the image data from a resource identified by a uniform resource identifier;
download the image data from a resource identified by a uniform resource locator;
download the image data from a resource identified by code of a web page;
download the image data from a resource indicated by a web browser;
download the image data from a resource indicated by a network driver;
obtain the image data from a web browser.

7. The apparatus of claim 1, wherein the one or more memories and the computer program code are further configured to, with the one or more processors, cause the apparatus further to perform:
obtain the association data by at least one of the following:
obtain the association data as a uniform resource identifier;
obtain the association data as a uniform resource locator;
obtain the association data as a domain name;
obtain the association data from code of a web page;
obtain the association data from a web browser;
obtain the association data from a network driver;
obtain the association data from a web browser.

8. The apparatus of claim 1, wherein the one or more memories and the computer program code are further configured to, with the one or more processors, cause the apparatus further to perform:
transform the reputation data into a download decision data of a target file to be downloaded on the basis of the association data; and
control download of the target file according to the download decision data.

9. The apparatus of claim 8, wherein the one or more memories and the computer program code are further configured to, with the one or more processors, cause the apparatus further to perform at least one of the following:
control the download of the target file according to the download decision data such that if the reputation data of the association data indicates that the target file is clean or safe, download is allowed, or if the reputation data indicates that the target file is malicious or not safe, download is not allowed, or if the reputation data indicates that the target file is suspicious, query a user whether the download is allowed or not allowed;
if the download of the target file has been initiated before setting the reputation data, control the download of the target file according to the download decision data such that the download is continued if the reputation data indicates that the target file is clean or safe, or the download is interrupted if the reputation data indicates that the target file is malicious or not safe, or if the reputation data indicates that the target file is suspicious, query a user whether the download is continued or interrupted;
if the download of the target file has been completed before setting the reputation data, control the download of the target file according to the download decision data such that the downloaded target file is forwarded for further processing if the reputation data indicates that the target file is clean or safe, or the downloaded target file is discarded if the reputation data indicates that the target file is malicious or not safe, or if the reputation data indicates that the target file is suspicious, query a user whether the downloaded target file is forwarded for further processing or discarded.

10. The apparatus of claim 1, wherein the apparatus is implemented by at least one of the following:
a client apparatus;
an electronic digital computer;
a desktop computer,
a portable computer, a laptop computer,
a tablet computer,
a smartphone,
a mobile phone,
an electronic apparatus processing the image data and the association data relating to the image data;
a server apparatus;
a cloud;
an antivirus cloud;
a peer node.

11. A method comprising:
obtaining image data which determines a displayed image of a user interface;
obtaining association data included in the image data, wherein the association data comprises action instructions which are performed when the user interface is manipulated by the user;
identifying the image data as corresponding to an identified image among known reference images, wherein, in order to identify the image data as corresponding to an identified image among known reference images, there is searching for image patterns within the image data, wherein the searching for image patterns within the image data is searching for patterns in the displayed image of the user interface displayed on a screen for the user with computer vision technology and the image patterns are images or portions of images that are known to the user by their purpose or context; and
setting reputation data of the association data as suspicious, if the association data does not match acceptable associations for the identified image.

12. The method of claim 11, wherein the displayed image of the user interface comprises at least one of:
a displayable user interface element;
a visual appearance of a web page; and
a visual appearance of an application.

13. The method of claim 11, further comprising:
in order to identify the image data as corresponding to an identified image among known reference images, performing an optical character recognition for the image data.

14. The method of claim 11, further comprising at least one of the following:
if the association data for the identified image is marked as clean or safe, setting the reputation data as clean or safe;
if the association data for the identified image is marked as malicious or not safe, setting the reputation data as malicious or not safe.

15. The method of claim 11, further comprising:
controlling use of the association data on the basis of the reputation data.

16. The method of claim 11, wherein the image data is obtained by at least one of the following:
downloading the image data from a resource identified by a uniform resource identifier;
downloading the image data from a resource identified by a uniform resource locator;
downloading the image data from a resource identified by code of a web page;
downloading the image data from a resource indicated by a web browser;
downloading the image data from a resource indicated by a network driver;
obtaining the image data from a web browser.

17. The method of claim 11, wherein the association data is obtained by at least one of the following:
obtaining the association data as a uniform resource identifier;
obtaining the association data as a uniform resource locator;
obtaining the association data as a domain name;
obtaining the association data from code of a web page;
obtaining the association data from a web browser;
obtaining the association data from a network driver;
obtaining the association data from a web browser.

18. The method of claim 11, further comprising:
transforming the reputation data into a download decision data of a target file to be downloaded on the basis of the association data; and
controlling download of the target file according to the download decision data.

19. The method of claim 18, further comprising at least one of the following:
controlling the download of the target file according to the download decision data such that if the reputation data of the association data indicates that the target file is clean or safe, download is allowed, or if the reputation data indicates that the target file is malicious or not safe, download is not allowed, or if the reputation data indicates that the target file is suspicious, query a user whether the download is allowed or not allowed;
if the download of the target file has been initiated before setting the reputation data, controlling the download of the target file according to the download decision data such that the download is continued if the reputation data indicates that the target file is clean or safe, or the download is interrupted if the reputation data indicates that the target file is malicious or not safe, or if the reputation data indicates that the target file is suspicious, query a user whether the download is continued or interrupted;
if the download of the target file has been completed before setting the reputation data, controlling the download of the target file according to the download decision data such that the downloaded target file is forwarded for further processing if the reputation data indicates that the target file is clean or safe, or the downloaded target file is discarded if the reputation data indicates that the target file is malicious or not safe, or if the reputation data indicates that the target file is suspicious, query a user whether the downloaded target file is forwarded for further processing or discarded.

20. A non-transitory computer readable medium comprising a set of instructions, which, when executed on an apparatus cause the apparatus to perform:
obtaining image data, which determines a displayed image of a user interface;
obtaining association data that is included in the image data, wherein the association data comprises action instructions which are performed when the user interface is manipulated by the user;
identifying the image data as corresponding to an identified image among known reference images, wherein, in order to identify the image data as corresponding to an identified image among known reference images, there is searching for image patterns within the image data, wherein the searching for image patterns within the image data is searching for patterns in the displayed image of the user interface displayed on a user's screen with computer vision technology and the image patterns are images or portions of images that are known to the user by their purpose or context; and setting reputation data of the association data as suspicious, if the association data does not match acceptable associations for the identified image.

\* \* \* \* \*